Oct. 30, 1973   R. J. ESPINOSA   3,769,396
METHOD FOR PREPARING MEASURED LENGTHS OF DENTAL FLOSS
Filed March 24, 1971   3 Sheets-Sheet 1
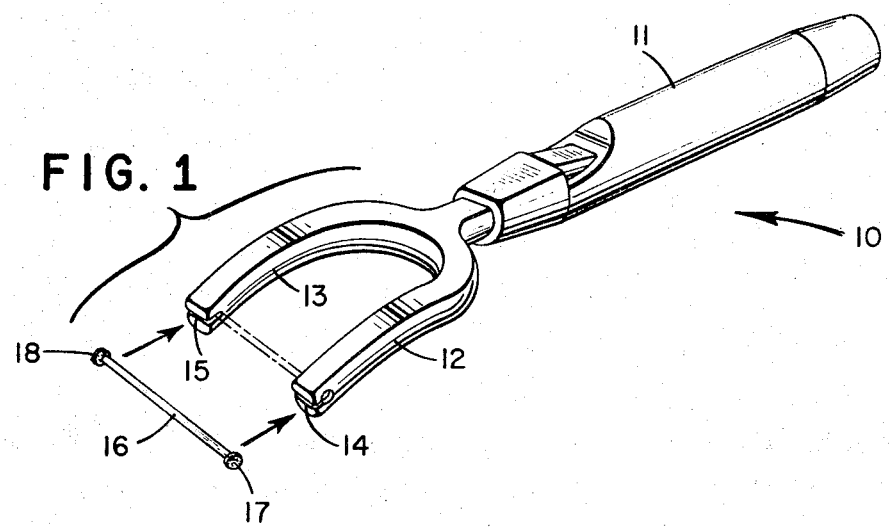
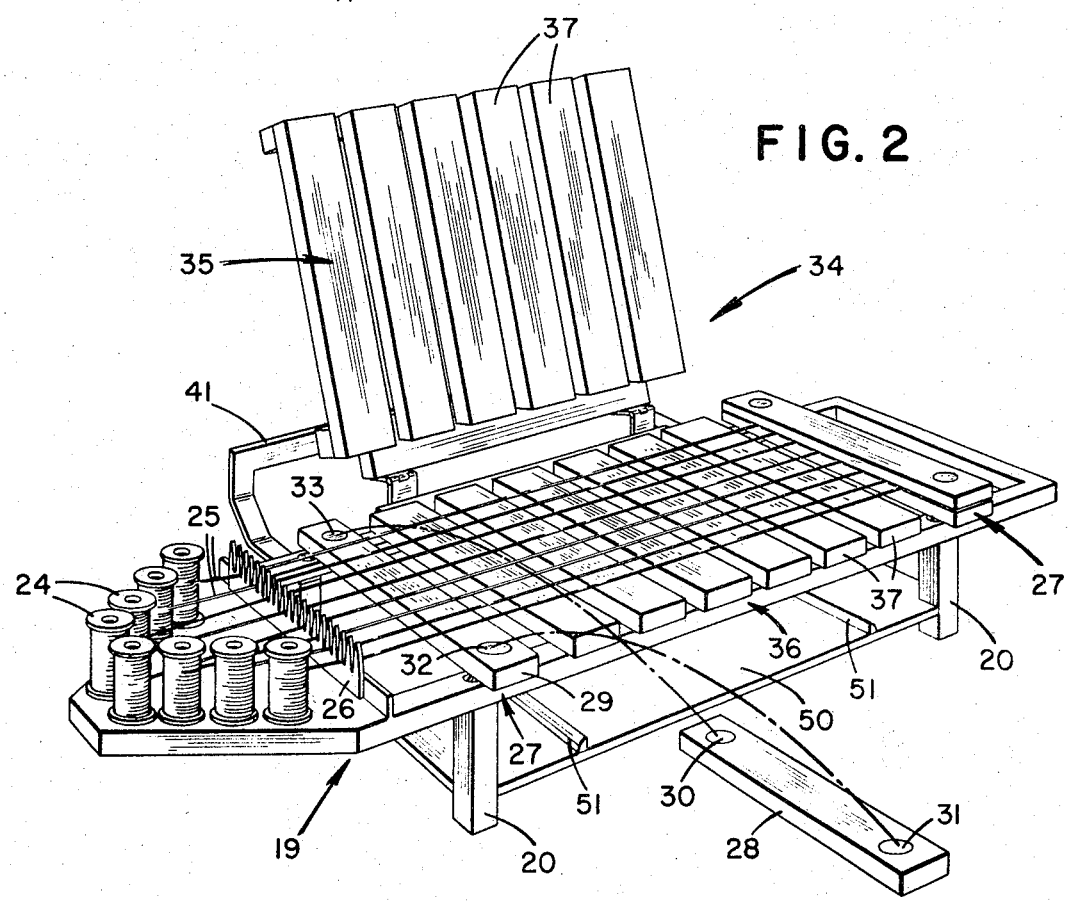
INVENTOR
RENE J. ESPINOSA
BY
Stevens, Davis, Miller & Mosher
ATTORNEYS

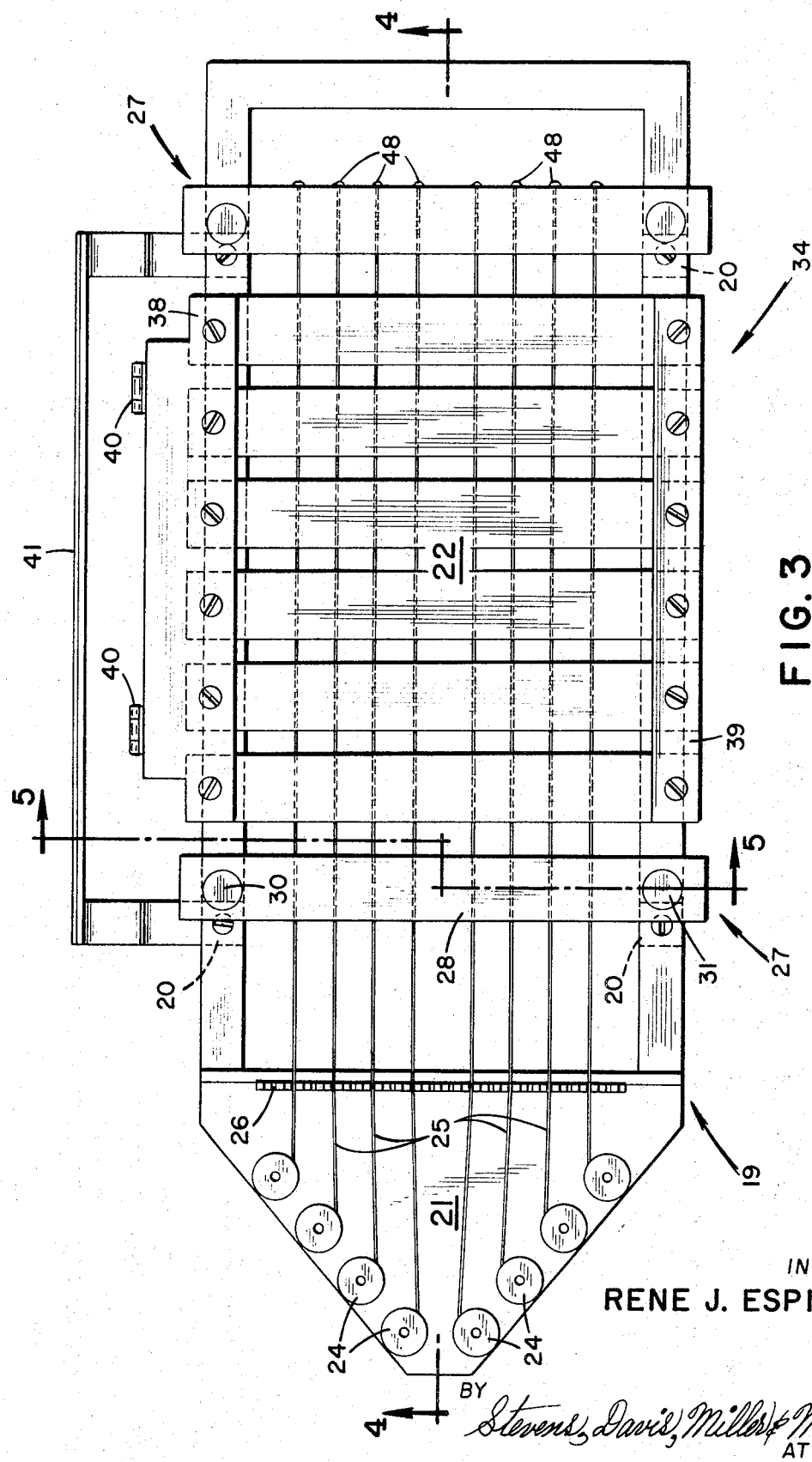

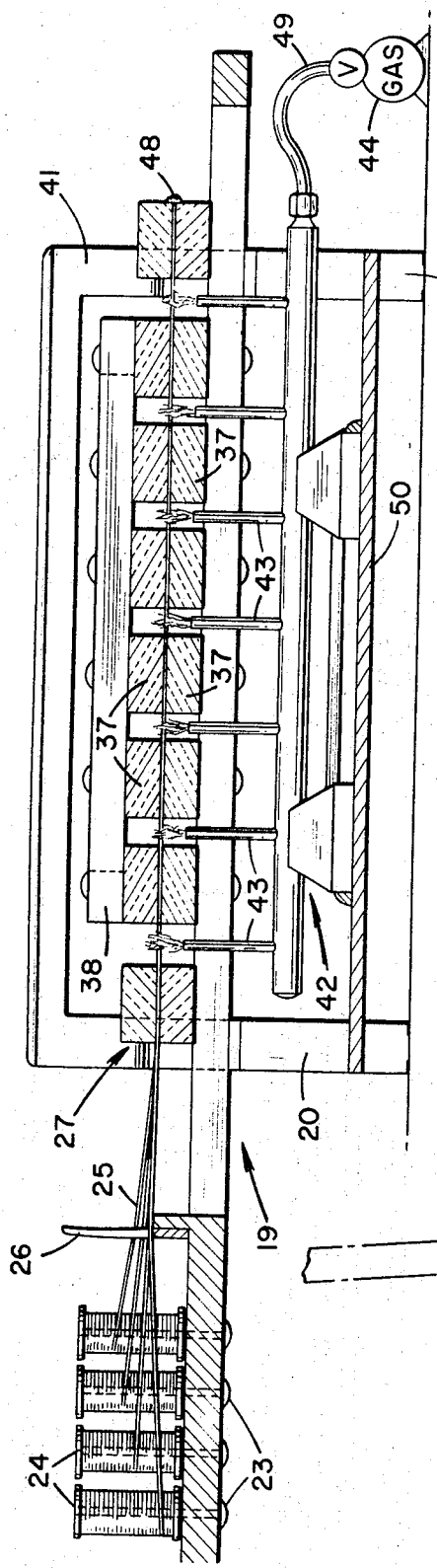
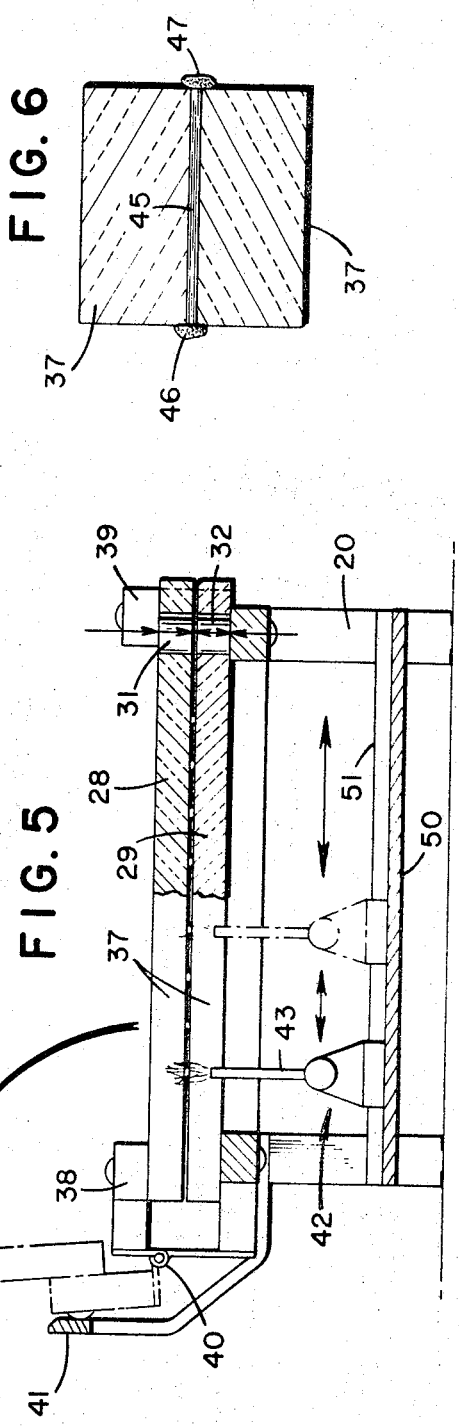

# United States Patent Office 3,769,396
Patented Oct. 30, 1973

3,769,396
METHOD FOR PREPARING MEASURED LENGTHS OF DENTAL FLOSS
Rene Jose Espinosa, 21 S. Stone Ave.,
La Grange, Ill. 60525
Filed Mar. 24, 1971, Ser. No. 127,537
Int. Cl. B29c 17/14; B29d 31/00
U.S. Cl. 264—157      1 Claim

ABSTRACT OF THE DISCLOSURE

A method and apparatus for preparing measured lengths of dental floss for use in dental hygiene devices which include stretching wax-coated synthetic unplasticized vinyl resin dental floss between a pair of spaced clamps, closing a grid of heat resistant bars about the stretched dental floss and applying a high-heat source to the dental floss between the bars of the grid to melt the exposed dental floss thereby forming measured lengths of dental floss with nubs at each end thereof.

---

A well known source of tooth decay is the entrapment of food particles between adjacent teeth. It has long been accepted dental hygiene practice to remove these particles by the use of a strip of material known as dental floss. Most commonly a length of floss is tensioned between the user's two index fingers which must then be extended into the user's mouth while positioning the floss and moving it between the teeth with a reciprocal motion. This is at best an awkward operation and usually is wasteful in the amount of dental floss used.

There have recently been a number of developments in the area of dental hygiene devices which are dental floss holders designed to hold a measured length of dental floss sufficient for cleaning one's teeth and which may be used with much more dexterity than with the above-mentioned common method. An example of such a device is described in my copending patent application Ser. No. 859,882 filed Sept. 22, 1969 and entitled Dental Floss Holder and Floss Therefor, now Pat. No. 3,631,869. These holders require that the dental floss used therewith have a predetermined length and some means on the ends by which the dental floss can be gripped in tension. While a knot tied in the dental floss will do, it is rather slow to prepare a length of dental floss by this method and the resulting length of dental floss may well be outside of the requirements.

There are other well known methods for treating advancing lengths of thermal plastic filament material by haet and pressure steps. These methods form crimps in the filament or roughen the surface thereof. Neither of these methods is suitable for the present use since neither the crimps nor roughness will provide a sufficient grip when the filament is tensioned in the holder.

The present invention provides a uniquely simplified method and apparatus for forming measured lengths of dental floss with nubs on both ends thereof by placing continuous lengths of dental floss between pairs of heat-resistant bars formed into a grid and passing heat between the spaced pairs of bars to melt the exposed dental floss thus forming a length of dental floss equal in length to the width of the bars and with nubs formed integrally on the ends thereof. Thus it is an object of the present invention to provide a novel measured length of dental floss having integral nubs on the ends thereof.

It is another object of the present invention to provide a method for forming measured lengths of dental floss with integral nubs on the ends thereof.

It is a further object of the present invention to provide a novel apparatus for producing measured lengths of dental floss, with integral nubs on the ends thereof, which may be readily and economically produced.

The means for accomplishing the foregoing objects and other advantages, which will be apparent to those skilled in the art, are set forth in the following specification and claim and are illustrated in the accompanying drawings dealing with a basic embodiment of the present invention. Reference is now made to the drawings in which:

FIG. 1 is a perspective view of a length of dental floss and an appropriate holder;
FIG. 2 is a perspective view of one form of the apparatus suitable for performing the inventive method;
FIG. 3 is a plan view of the apparatus shown in FIG. 2;
FIG. 4 is a longitudinal section taken along line 4—4 of FIG. 3 and a suitable heat source means;
FIG. 5 is a sectional view taken along line 5—5 of FIG. 3;
FIG. 6 is a detailed vertical sectional view showing one length of dental floss between the closed bars of the grid.

Before discussing the particular inventive method and apparatus, it should be noted that while dental floss is made of a number of different materials, such as natural silk fibers, the present invention is intended to be used with dental floss of unplasticized vinyl resin described by Pat. No. 2,381,142 to Stonehill, issued Aug. 7, 1945.

Turning now to the figures, the holder illustrated in FIG. 1 is of the type described in my copending application Ser. No. 859,882. The holder 10 has a handle portion 11 and a pair of parallel prongs 12 and 13 extending from one end of the handle portion. Slots 14 and 15 are provided in the free ends of prongs 12 and 13, respectively. The measured length of dental floss 16 has nubs 17 and 18 integrally formed on the ends thereof. The distance between the outer edges of the prongs is substantially equal to the distance between the nubs when the dental floss is tensioned. The measured length of dental floss is placed in the slots 14 and 16 with the nubs 17 and 18 on the outer sides of the prongs 12 and 13, respectively. Means can be provided to further tension the dental floss between the prongs after mounting. The advantages of this arrangement are aptly described in my previously-mentioned copending patent application Ser. No. 859,882.

The FIG. 2 shows an exemplary embodiment of the apparatus for carrying out the inventive method.

The apparatus comprises a frame 19 having depending legs 20 and can be generally divided into two portions, namely, a feed portion 21 and a treating portion 22. The feeding portion 21 of the frame 19 has a plurality of vertically extending pins 23 on which are mounted a plurality of bobbins 24 each holding a length of dental floss 25. The feed portion is also provided with a comb-like device 26 which is fixedly mounted on the frame 19 with its teeth extending vertically upwardly for separating the individual strands of floss as they are fed from the individual bobbins.

The treatment portion 22 of the frame 19 has removable clamps 27 at each end thereof and normally arranged to be substantially parallel to each other.

Each clamp is formed by two bars 28 and 29 of heat insulating material with magnets 30, 31, 32 and 33 at the ends thereof. The magnets serve a two-fold purpose in that they hold the clamp bars together and they hold the clamps 27 in place on the frame 19 when the dental floss is tensioned.

Between the spaced clamps 27 there is a grid member 34 formed by upper 35 and lower 36 matching sets of parallel heat resistant bars 37. The lower set of bars 36 is fixedly mounted on the frame 19. The upper set of bars has cross members 38 and 39 at the ends thereof fixing the bars in parallel spaced relationship. The upper and lower sets of bars are hinged together on one side by hinge means 40. A rest member 41 is provided secured to the frame 19 and positioned to receive and hold the upper set of bars 35 in the open position. The apparatus is completed by the heat source 42 which has here been shown as an arrangement of gas jets 43 positioned below the frame 19 and fed from a gas supply 44 through the means of flexible hose 49. The heat source 42 is preferably arranged on a table 50 arranged between the legs 20 and provided with a pair of spaced parallel guides 51. As can best be seen in FIG. 5, the heat source 42 can be provided with either manual or automatic means (not shown) for sliding the heat source transversely across the width of the apparatus so that the individual strands of dental floss 25 are severed between the bars 37 and the integral nubs are formed. This arrangement allows for an economical and simplified heat source structure since each gas jet 43 is positioned close to the dental floss.

The operation of the device is as follows: a plurality of bobbins 24 are mounted on the pins 23 and the dental floss 25 thereon is initially threaded through the comb-like device 26 and across the open clamps 27 and grid member 34. The free ends of the dental floss are secured first by closing one clamp 27. The opposite end of the dental floss, the side adjacent the comb-like member, is pulled to place the dental floss under a slight tension and clamped by the other clamp 27. The grid member 34 is then closed by lowering the upper set of bars 36 so that a number of lengths of dental floss are held in a heat insulated condition between the sets of bars. While it is preferable that the spacing between each clamp 27 and the adjacent bar 35 of the grid member be equal to the spacing between the bars, this is not an essential requirement. Marking guides could be placed on the frame or the end gas jets could be made larger to compensate for the additional length of dental floss. However, since the positioning of the clamps is for the purpose of tensioning the dental floss, some allowance for spacing variation should be made. The gas jets are then ignited and the heat source 42 is moved across the table 50 to heat and melt the exposed dental floss between the adjacent closed pairs of heat insulated bars thus forming the configuration of the dental floss as shown in FIG. 6, namely, a measured length of dental floss 45 with integral nubs 46 and 47.

Upon completion of the melting process, the gas jets are turned off, the upper set of bars 35 is raised, and the completed severed lengths of dental floss having nubs on either end are removed from the lower set of bars 36, preferably by a rake-like device or other suitable means not shown.

Subsequent operations of the apparatus are similar to the above-described initial operation. However, nubs will be formed at the free ends of the dental floss at the clamp 27 nearest the comb-like member 26. Since both clamps 27 are held together and on the frame 19 only by their magnets 30 to 33, the apparatus can be restranded merely by opening the grid member 34 and moving the clamp 27 nearest the comb-like member 26 to the far side of the grid member 34, to the right in FIGS. 2, 3 and 4. The nubs 48, see FIG. 4, on the free ends of the dental floss 25 will not slip between the bars 28 and 29 of the clamp 27 so that the dental floss will again be positioned. The other clamp 27 can be opened to remove the completely formed measured lengths held therein and clamped around the dental floss adjacent the comb-like member 26. The clamps are preferably but not necessarily spaced from the grid member by a distance substantially equal to the spacing between the bars of the grid member. The grid member 34 can be closed and the heat operation repeated.

It should be noted that the bars 28 and 29 of the clamps 27 are of equal width as the bars 37 of the grid member 34 and are preferably of the same heat resistant material. This allows the formation of an extra set of measured lengths of dental floss for each operation of the device, a total of 56 in the apparatus illustrated.

The present invention may be embodied in other specific forms without departing from the spirit or essential characteristics thereof. The present embodiment is therefore to be considered in all respect as illustrative and not restrictive, the scope of the invention being indicated by the appended claim rather than the foregoing description and all changes which come within the meaning and range of equivalency of the claim are therefore to be embraced therein.

I claim:
1. A method for producing precise predetermined equal lengths of dental floss which lengths terminate in integral nubs at each end thereof, comprising:
   tensioning a span of floss composed of synthetic unplasticized vinyl resin material between spaced apart pairs of mating blocks of heat resistant material,
   clamping portions of said tensioned span of said material between pairs of mating blocks of heat resistant material which pairs are spaced from adjacent pairs, the width of said pairs being equal to the aforementioned predetermined length and applying heat to the unclamped portions of said tensioned span to sever said span by melting said unclamped portions up to the surfaces of said mating blocks which prevent any further spread of the melting and creating nubs on the ends of a plurality of said thus formed lengths of dental floss.

References Cited
UNITED STATES PATENTS

| | | | |
|---|---|---|---|
| 2,702,555 | 2/1955 | De Mar | 264—80 X |
| 3,574,804 | 4/1971 | Joonase | 264—80 |
| 3,092,439 | 6/1963 | Harrison | 264—230 X |
| 3,392,070 | 7/1968 | Gropp | 264—163 X |
| 3,270,408 | 9/1966 | Nealis | 264—230 X |
| 3,157,721 | 11/1964 | Barish | 264—157 |
| 2,702,556 | 2/1955 | De Mar | 264—80 X |
| 3,673,301 | 6/1972 | Billarant | 264—163 |

ROBERT F. WHITE, Primary Examiner

A. M. SOKAL, Assistant Examiner

U.S. Cl. X.R.

264—80, 163